Mar. 5, 1929.  O. H. GOETZ  1,703,878
AUTOMOBILE BUMPER AND CLAMP
Original Filed Dec. 14, 1926   2 Sheets-Sheet 1
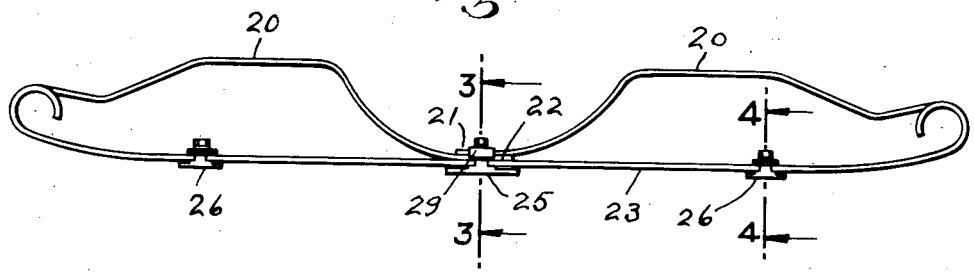
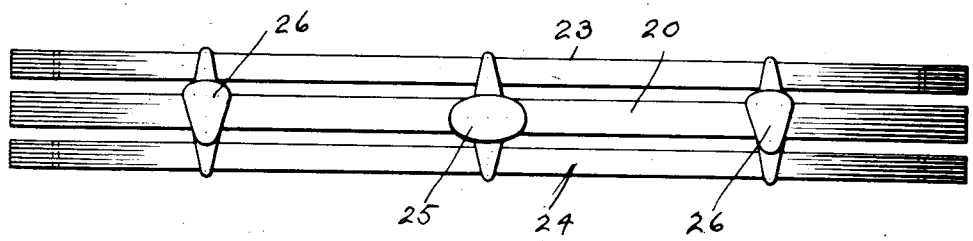
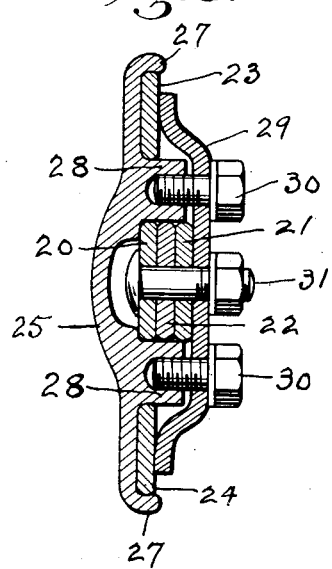
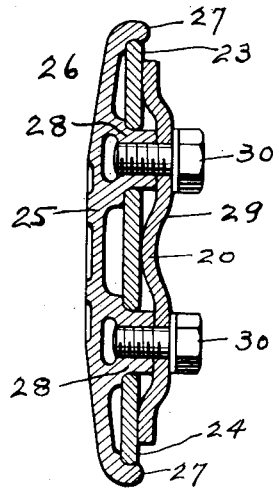
INVENTOR.
OSCAR H. GOETZ,
BY
Frederick S. Duncan, ATTORNEY.

Mar. 5, 1929.  O. H. GOETZ  1,703,878
AUTOMOBILE BUMPER AND CLAMP
Original Filed Dec. 14, 1926   2 Sheets-Sheet 2
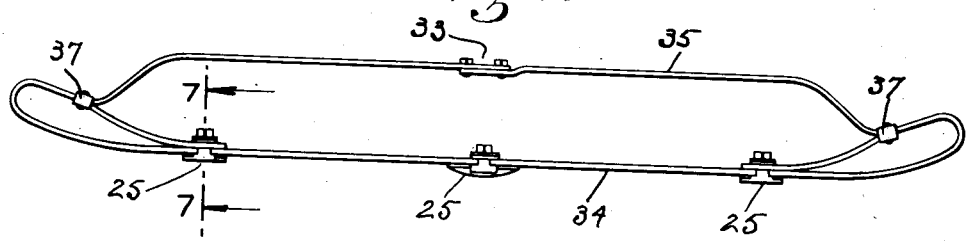
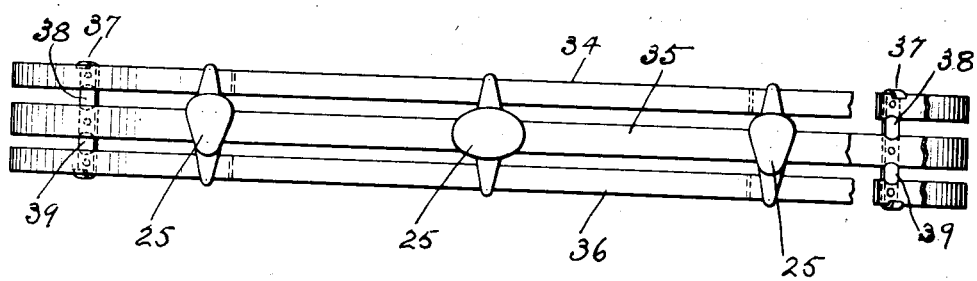
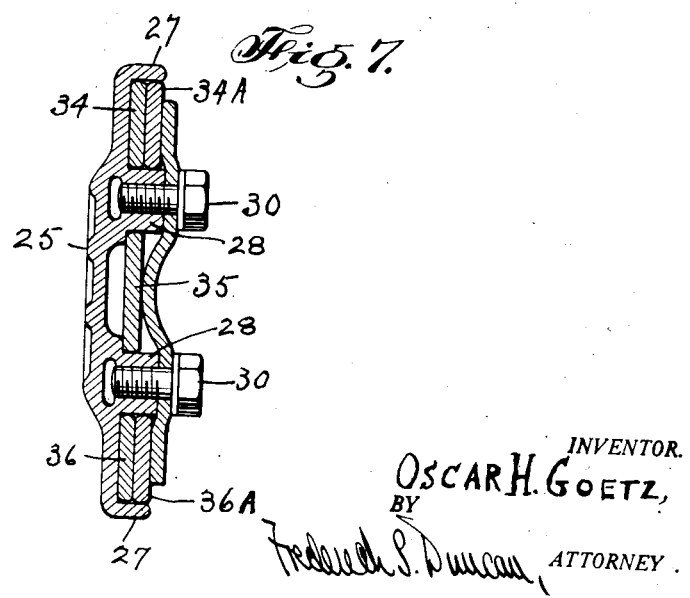
INVENTOR.
OSCAR H. GOETZ,
BY
ATTORNEY.

Patented Mar. 5, 1929.

1,703,878

UNITED STATES PATENT OFFICE.

OSCAR H. GOETZ, OF CHICAGO, ILLINOIS, ASSIGNOR TO AMERICAN CHAIN COMPANY, INC., A CORPORATION OF NEW YORK.

AUTOMOBILE BUMPER AND CLAMP.

Original application filed December 14, 1926, Serial No. 154,726. Divided and this application filed September 10, 1928. Serial No. 304,961.

This invention relates to automobile bumpers, and more particularly to bumpers of the type commonly known as parallel bar or multi-bar bumpers, comprising several impact bars arranged in superimposed vertical relation, spaced apart, and constituting an impact structure usually supported by one or more back bars or members adapted to be attached to the frame of an automobile, suitable clamping devices being used to hold the bumpers in assembled relation. An object of this invention is to provide an improved bumper of the above type, and also to provide improved clamping means which will securely hold the parts of the bumper together, and which are inexpensive to manufacture, and present a pleasing appearance in use.

Another object of the invention is to provide an improved type of clamp readily adaptable for use with different forms of bumpers of the above general type, and which embodies certain novel advantageous connecting and spacing means that are of utility regardless of the specific variations of structure which may be adopted to meet the requirements of particular installations.

The present application has been divided from my copending application Serial No. 154,726, filed December 14, 1926, in which are claimed generically clamps comprising front and rear plates bolted together to form a secure holding device for the bars of the bumper, one of the plates having a boss or bosses adapted to extend between the bars, and serve as spacing means therefor, together with means to hold said plates and bars in assembled relation.

A clear conception of the construction and further objects of this invention may be had from the following specification and the accompanying drawings in which:

Fig. 1 discloses in plan view a bumper embodying the invention.

Fig. 2 is a front view of the bumper shown in Fig. 1.

Fig. 3 is an enlarged sectional view through 3—3 of Fig. 1.

Fig. 4 is a similar section through 4—4 of Fig. 1.

Fig. 5 shows in plan view another form of bumper using a modified form of the invention.

Fig. 6 is a front view of Fig. 5.

Fig. 7 is an enlarged sectional view through 7—7 of Fig. 5.

The bumper shown in Figs. 1 and 2 is composed of a main bar 20, having its ends formed in loops, the continuations rearwardly of which are bent forwardly, as shown, to a point in connection with the front bar portion, in the same horizontal plane. The ends 21 and 22 of the rear bar 20 are then secured in a clamp shown in cross-section in Fig. 3, by which the bar 20 is connected to vertically aligned impact bars 23 and 24, in parallelism with the main bar 20, and having each end formed in a shepherd's crook of the same curvature as the loop ends of bar 20.

The clamp shown in Fig. 3 comprises a metal front plate 25, having lips 27 and bosses 28 between which the bars 20, 23 and 24 are positioned. The bosses or lugs 28 are tapped to receive the bolts 30. A hole is drilled through the center of the front portions of bar 20, and registering holes through the ends 21 and 22 of said bar, of a suitable diameter to receive bolt 31. A rear plate 29, shaped as shown in Fig. 3, is provided with holes suitable to accommodate bolts 30 and 31. Bolt 31 is passed through bar 20 at its ends 21 and 22, and thence through the back plate 29; bolts 30 serving to clamp the front plate 25 to back plate 29, embracing the bars.

The bars 23 and 24 are preferably joined at regions intermediate their ends and midposition by other clamps, such as that indicated in Fig. 1 by the numeral 26, which is shown in detail in Fig. 4. Clamp 26 is of somewhat similar construction to that already discussed, having a stamped front plate 25, with lips 27 and a pair of bosses 28 for engagement with the bars 20, 23 and 24; the material difference being in the fact that only one bar is held at the center, therefore necessitating a different shape for the rear plate 29, which may be of the shape illustrated.

The bumper shown in Fig. 5 uses a further modified form of clamp. The main bar 35 is constructed in a manner similar to bar 20, with the exception that it is not drawn forward and bolted into a clamp similar to that shown in Fig. 3 but has its ends bolted together at 33, thereby forming a straight attaching bar. The loop ends of bars 34 and 36 are of the same curvature as the loop ends of bar 35, and are drawn forward at an angle to the impact portion of each respective bar and fastened in a clamping means such as disclosed in Fig. 6, at the point where the curvature of bar 35 no longer follows the line of bars 34 and 36, and here a clamp 37 is used to hold the bars in vertical alignment. This clamp consists of a strip of steel having two grooved lugs 38 and 39 (see Fig. 6) on its back portion, and the ends of which are bent to conform to the shape and width of the upper and lower bars 34 and 36. The clamp is slipped into place over the ends of the bars, and then riveted before the ends of the bars are bent into their final form.

The clamp shown in Fig. 7 consists of a front plate 25, constructed as hereinbefore described with the exception that the lips 27 are of sufficient depth to accommodate two thicknesses of bumper bar such as the ends of bars 34 and 36 which are designated as 34$^A$ and 36$^A$, and the contiguous impact portion of each bar. The whole clamp is held together by bolts 30 in a manner similar to that described above.

I claim:

1. An automobile bumper comprising as a main element a bumper bar constructed in a single horizontal plane having a front impact portion with loop ends thereon and a rear attaching portion formed in continuation of said loop ends, said bumper comprising also auxiliary impact bars clamped in parallelism with the impact portion of said main bar by a clamp comprising a front plate with lips and bosses thereon for spacing and holding said bars in vertical alignment, a rear hasp shape plate having holes therein for accommodating bolts, said bosses being tapped to accommodate said bolts to force said rear plate against said front plate thereby firmly holding said impact bars in rigid vertical alignment.

2. In an automobile bumper of the type described a clamp comprising a front plate with lips and bosses thereon, a rear hasp shape plate, said bosses being tapped, said rear plate having a plurality of holes therein of a diameter equal to the tapped holes in said bosses, said bosses being equal in length to three thicknesses of bumper bar and bolts for forcing said rear plate against said bars when positioned between said lips and bosses of the front plate and one of said bolts passing through three thicknesses of bumper bar and said rear plate.

3. In an automobile bumper comprising as a main element a bumper bar constructed in a single horizontal plane having a front impact portion with loop ends thereon and a rear attaching bar portion formed by continuing said loop ends and bolting them together, said bumper comprising also auxiliary impact bars supported by and clamped to said main bar, said auxiliary bars being in parallelism with the impact portion and loop ends thereof and in the same vertical plane the free ends of said auxiliary bars being drawn forward at an angle to their respective impact portions and clamped, said clamp comprising a front plate having lips and bosses thereon and a rear hasp shape plate having a plurality of holes therein of a diameter equal to the holes tapped in said bosses, said lips and bosses being of a length equal to two thicknesses of said bumper bar and bolts for forcing said rear plate against said bars when in position between the lips and bosses of said front plate.

In testimony whereof, I have signed this specification.

OSCAR H. GOETZ.